US006964516B2

(12) United States Patent
Coleman, Jr.

(10) Patent No.: US 6,964,516 B2
(45) Date of Patent: Nov. 15, 2005

(54) DEVICE AND METHOD FOR MEASURING TEMPERATURE IN MOLTEN METALS

(75) Inventor: Thomas C. Coleman, Jr., Beaver, PA (US)

(73) Assignee: Heraeus-Electro Nite International N.V., Houthalen (BE)

(*) Notice: Subject to any disclaimer, the term of this patent is extended or adjusted under 35 U.S.C. 154(b) by 0 days.

(21) Appl. No.: 10/776,883

(22) Filed: Feb. 11, 2004

(65) Prior Publication Data

US 2005/0175065 A1 Aug. 11, 2005

(51) Int. Cl.[7] .............................. G01J 5/08; G01K 1/12
(52) U.S. Cl. ...................... 374/139; 374/140; 374/131; 266/99
(58) Field of Search ................................ 374/139, 140, 374/131, 208, 155, 157; 266/88

(56) References Cited

U.S. PATENT DOCUMENTS

| | | | | |
|---|---|---|---|---|
| 3,610,601 A | * | 10/1971 | Bishop, Jr. .................. | 374/140 |
| 3,650,414 A | * | 3/1972 | Asada et al. ................. | 374/140 |
| 3,763,704 A | * | 10/1973 | Blau et al. ................... | 374/140 |
| 4,468,771 A | * | 8/1984 | Zhukov et al. .............. | 374/131 |
| 5,158,366 A | * | 10/1992 | Nagai et al. ................. | 374/208 |
| 5,180,228 A | * | 1/1993 | Tarumi et al. ............... | 374/139 |
| 5,447,373 A | * | 9/1995 | Okuhara ...................... | 374/131 |
| 5,709,474 A | * | 1/1998 | Richardson et al. ......... | 374/140 |
| 5,733,043 A | * | 3/1998 | Yamada et al. .............. | 374/131 |
| 6,004,031 A | * | 12/1999 | Takayama et al. ........... | 374/131 |
| 6,227,702 B1 | * | 5/2001 | Yamada et al. .............. | 374/140 |
| 2003/0002560 A1 | * | 1/2003 | Yamanaka et al. ........... | 374/139 |

FOREIGN PATENT DOCUMENTS

| | | | | |
|---|---|---|---|---|
| EP | 0 655 613 A1 | | 5/1995 | |
| JP | 56117134 A | * | 9/1981 | ............ G01K 7/02 |
| JP | 02016449 A | * | 1/1990 | .......... G01N 33/20 |
| JP | 03-284709 A | | 12/1991 | |
| JP | 04-329323 A | | 11/1992 | |
| JP | 7-229791 A | | 8/1995 | |

OTHER PUBLICATIONS

Yonezawa et al., English Language translation of JPO Abstract of JP 61246636 A; "Protective Tube for Continuously Measuring Temperature of Molten Steel", Nov. 1, 1986, 1 page.*

* cited by examiner

Primary Examiner—Gail Verbitsky
Assistant Examiner—Stanley J. Pruchnic, Jr.
(74) Attorney, Agent, or Firm—Akin Gump Strauss Hauer & Feld, LLP

(57) ABSTRACT

A device is provided for measuring temperature in molten metals with an optical fiber. The optical fiber is connected directly or indirectly to a measurement instrument and is held by a carrier. The immersion end of the fiber is fed through a body that can be consumed in the metal melt. The consumable body exhibits a consumption rate of at most 10 cm/min, and the consumption rate is approximately equal to or greater than the rate at which the structure of the optical fiber is destroyed.

16 Claims, 3 Drawing Sheets

DEVICE AND METHOD FOR MEASURING TEMPERATURE IN MOLTEN METALS

BACKGROUND OF THE INVENTION

The invention is directed to a device for measuring temperature in molten metals with an optical fiber, which is connected directly or indirectly to a measurement instrument and which is held by a carrier. The immersion end of the fiber is guided by a body that can be consumed in the melt. The invention is further directed to a method for measuring temperature in molten metals with an optical fiber, which is connected directly or indirectly to a measurement instrument and optionally to a detector and which is held by a carrier.

Such devices are known, for example, from European published patent application EP 655 613 A1. In the device described there, the optical fiber has a protective cladding consisting of several layers. The protective cladding dissolves at a rate of 1 to 10 cm per second and therefore, after a relatively short time, the cladding can no longer provide optimum protection for the optical fiber. The protective cladding contains, among other things, particles with a melting point higher than the temperature of the molten metal to be measured.

Similar devices are known from Japanese published patent applications JP 03-126500 or JP 03-284709. In addition, the literature provides numerous references for the use of optical fibers in general for measurements in molten metals.

BRIEF SUMMARY OF THE INVENTION

An object of the present invention is to improve the known devices and particularly the protection of optical fibers. A further object of the invention is to provide a method for measuring temperature in molten metals with an optical fiber.

The above objects are achieved in a device for measuring temperature in a metal melt, in which the device comprises an optical fiber connected directly or indirectly to a measurement instrument and held by a carrier. According to the invention, the optical fiber has an immersion end which is guided through a melt-consumable body, wherein the consumable body exhibits a consumption rate in the melt of at most 10 cm/min and wherein the consumption rate is approximately equal to or greater than a rate at which the optical fiber is destroyed.

Because the body has a consumption rate of at most 10 cm per minute and the consumption rate is approximately equal to or greater than the rate at which the structure of the optical fiber is destroyed, it is guaranteed, on one hand, that during the measurement, a free surface of the non-destroyed optical fiber is always exposed and available for measurement and, on the other hand, the optical fiber is sufficiently protected along its length. The destruction of the fiber structure inevitably begins at the immersion end of the fiber and continues in the axial direction, as long as the fiber is exposed to the conditions destroying the structure (high temperature, aggressiveness of the metal melt, etc.). Therefore, because the body surrounding the fiber is gradually destroyed, also starting from its immersion end, a new surface region of the fiber is always in contact with the molten metal in order to receive radiation in the sense of a black radiator and to transmit the radiation for temperature determination. Advantageously, the consumption rate of the consumable body is at most 1 cm per minute. Here, the consumption rate is based on a temperature range of about 600° C. to 1700° C. and particularly about 1400° C. to 1700° C. and is a property of the consumable body which depends, among other things, on the material and the structure of the body (for example, the bonding of the material).

It is advantageous if the consumable body has a higher melting point than iron (or steel, or cast iron) and is also insoluble in molten iron (or molten steel, or molten cast iron). In particular, it is advantageous if the body is made of at least one material from the group of molding sand, refractory cement, and bonded fly ash. The material can be bound by means of a binding agent. Molding sand, refractory cement, and bonded fly ash are particularly suitable for molten metals in the temperature range of about 600° C. to 1700° C. First, such materials are very heat-resistant. Bodies formed from these materials dissolve in the molten metal essentially through erosion, which dissolves the connections between the individual particles of the material. This process proceeds essentially starting from the immersion end in the direction of the longitudinal axis, thus in the direction of the axis of the optical fiber. The fiber is advantageously made of quartz glass.

It is expedient if the fiber is surrounded directly by a metal tube, particularly by a steel tube. Furthermore, it can be advantageous if the optical fiber is connected directly to a detector, wherein the detector can be arranged in the consumable body.

In an advantageous way a consumption sensor is arranged in the consumable body, in order to provide control over the general functionality of the device, especially for long-term measurements. Mechanical stabilizers, which improve a controlled consumption, can advantageously be arranged in the consumable body. In an advantageous embodiment, the consumable body is detachably arranged at one end of the carrier, so that it can be exchanged without reducing the functionality as such of the entire device. Electrical and/or optical signal lines are expediently connected in the consumable body by electrical and/or optical contacts to a contact piece (connector) in the carrier, in order to also achieve here a detachable connection.

In particular, it is advantageous if the optical fiber is formed as a continuous fiber and further if it can be movably arranged within the carrier and/or the consumable body. Consumed parts of the fiber can then be replaced simply by continuously feeding fiber through the carrier and the consumable body.

The method according to the invention is characterized in that the immersion end of the fiber guided through a consumable body, which can be consumed in the molten mass and which is held on the carrier, is immersed together with at least one part of the consumable body once or several times into the molten metal, that the consumable body is removed from the carrier after at least partial consumption and is replaced by another consumable body, and that the fiber is continuously fed through this body. This method lengthens the service life of the device significantly and enables measurements over a longer time period without interruption, as long as the consumable body does not have to be replaced.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
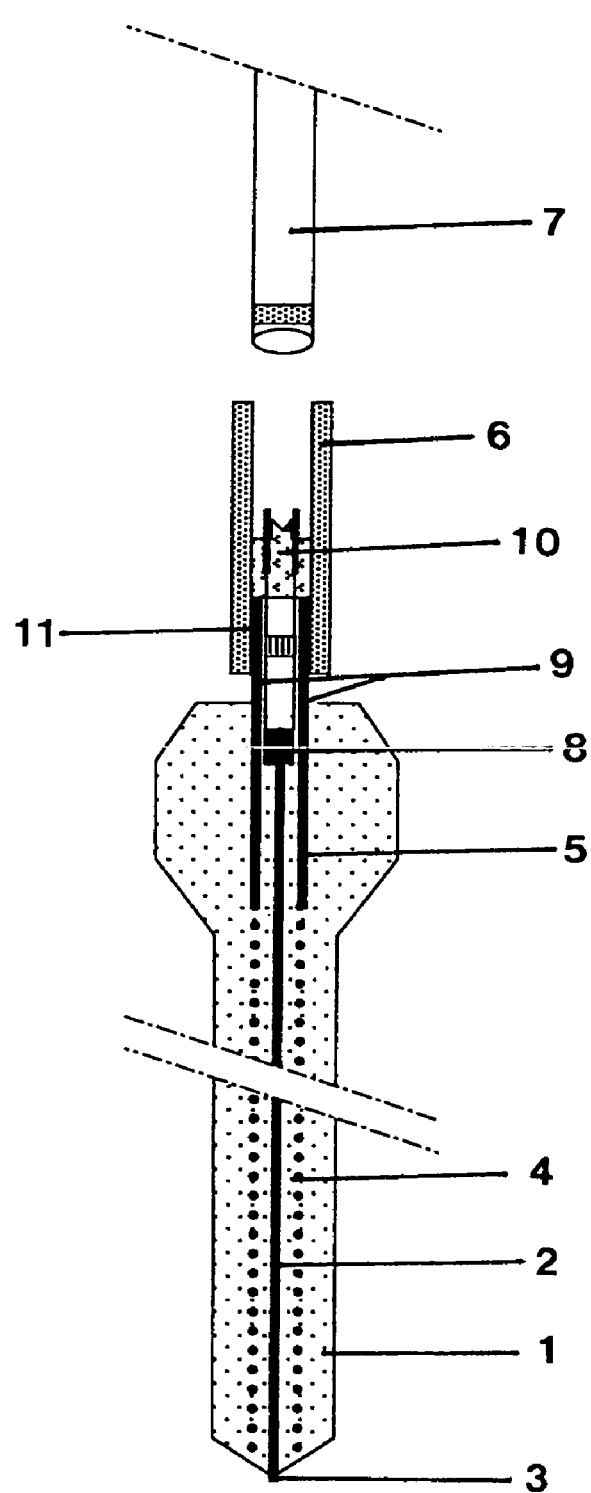
FIG. 1 is a schematic representation of a device according to a first embodiment of the invention.

The consumable body 1 shown in FIG. 1 is essentially formed, for example, from particles of molding sand, inorganic cement, or fly ash, wherein the bonding of the particles is accomplished by pressing or by the use of binding agents. The body 1, along whose longitudinal axis the optical fiber 2 is located, is immersed in a molten metal for measurement. Here, the end 3 of the optical fiber 2 receives measurement signals in the form of optical radiation, from which the temperature of the metal melt is calculated in a known way.

An abrasion-resistant coating can be applied on the surface of the body 1 to protect the body 1 during handling, especially outside of the molten metal. Within the molten metal the consumable body 1 slowly dissolves, starting from the immersion tip (adjacent the fiber end 3), such that the bonding between the particles of the body 1 slowly breaks up. The process begins at the immersion tip, because this is the first part exposed to the molten metal, and then continues in the axial direction. Here, the fiber 2 arranged in the body 1 is progressively exposed, so that further surface parts of the fiber 2 are exposed to the molten metal and receive radiation.

Incorporated in the body are stabilizers 4, which stabilize the body 1 and prevent destruction due to fractures during the transport or handling and which promote the consumption of the immersion tip. A metal tube 5, which serves first as a consumption sensor for the body 1 because it generates an electrical signal upon contact with the metal melt (thus when the body is destroyed to that point), is introduced into the end of the body 1 opposite from the immersion end. Second, the metal tube 5 serves as the holder for the body 1. For this purpose, the metal tube 5 is stuck on a carrier tube 6 made of metal. A standard lance 7, which enables the handling of the device, is inserted in this carrier tube 6.

In addition, the standard lance 7 serves for contacting the conductor lines coming from the body 1 and for the signal transmission. In the embodiment shown in FIG. 1, this is an electrical signal line. For this purpose, an optical detector 8 is arranged within the metal tube 5, receives the optical signal coming from the fiber 2, and converts it into an electrical signal, which is then transmitted with the help of conductor lines 9. The conductor lines are connected to the electrical contact piece 10 for connection with corresponding contacts arranged in the standard lance 7, so that the signals can be transmitted to electrical evaluation devices, for example. A calibration device 11, which can compare the signals with predetermined standard values, is arranged in the metal tube 5. In this way, for example, length changes of the optical fiber 2 occurring during long-term use can be detected and resulting signal losses can be equalized.

Figure 2:
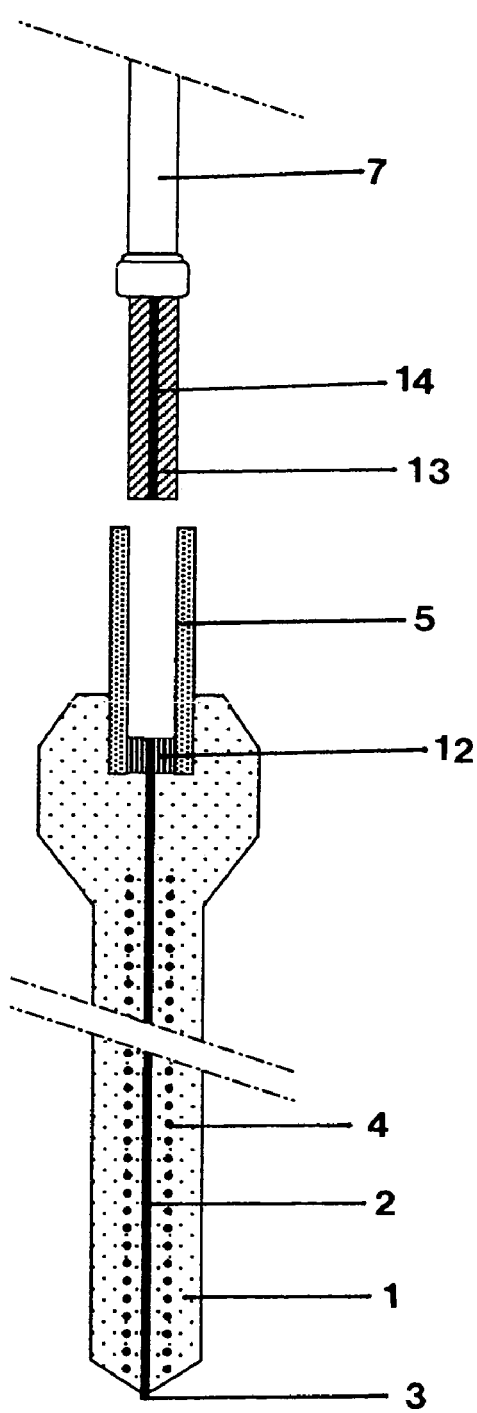
FIG. 2 is a schematic representation of a device according to a second embodiment of the invention.

FIG. 2 shows a second embodiment of the invention. In contrast to FIG. 1, for which the optical signals are already converted into electrical signals in or at the body 1 and then transmitted, the device according to FIG. 2 enables transmission of optical signals. Here, an optical connector 12 is arranged in the metal tube 5. This connector enables the coupling of the optical signal to an optical contact block 13, in which another optical fiber 14 receives the signals coming from the molten metal and transmits them to a stationary measurement device (not shown), where they are converted into electrical signals. The optical contact block 13 can be plugged into the metal tube 5. In both embodiments, after sufficient consumption, the consumable body 1 can be exchanged by pulling it from the standard lance 7 and then replacing it with a new body 1.

Figure 3:
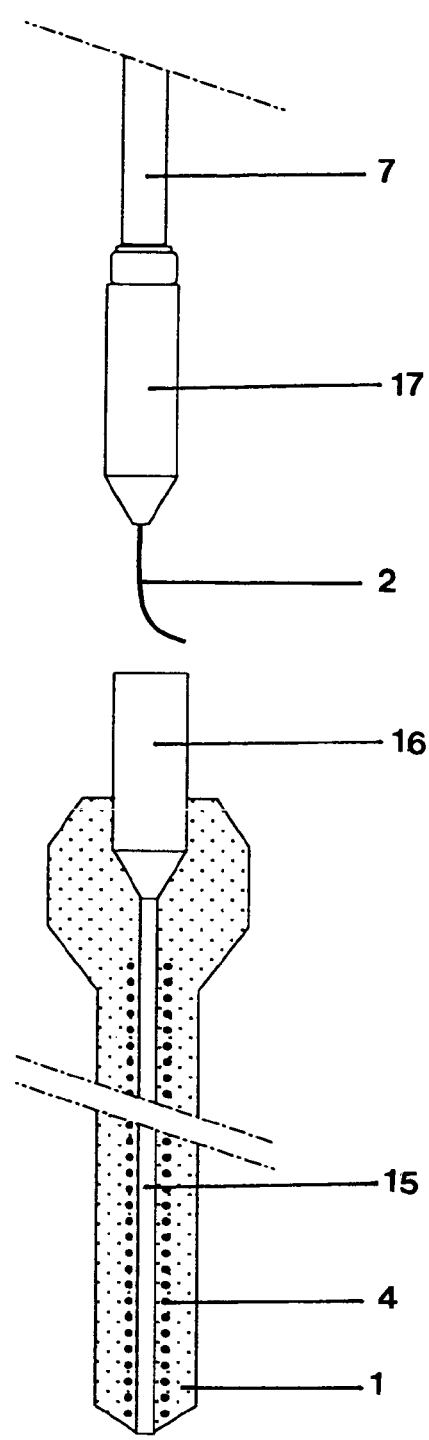
FIG. 3 is a schematic representation of a device according to a third embodiment of the invention.

While the optical fiber 2 in the embodiments shown in FIGS. 1 and 2 is arranged rigidly in the body 1, FIG. 3 shows an embodiment with an axial bore 15, through which an optical fiber 2 is guided and can be continuously fed. For this purpose, a mechanical connector 16 (for example a metal tube) is arranged in the end of the body 1 opposite the immersion end. A contact block 17 arranged on the standard lance 7 can be pushed into this connector 16. For better guidance of the optical fiber 2, a funnel-shaped transition is provided at the connection of the mechanical connector 16 to the bore 15. This transition enables better insertion of the optical fiber 2 into the bore 15. Inside the contact block 17 a fiber guidance system is arranged in a manner known per se. One such arrangement enables a so-called endless or continuous fiber to be constantly fed according to its consumption, which guarantees a certain independence of the wear of the optical fiber 2 from the consumption of the body 1. This can lead to an improved and longer-lasting functionality of the measurement device.

Obviously, a calibration device (not shown) can also be provided in the embodiments according to FIGS. 2 and 3. This is then mounted at the other end of the optical fiber 2, thus usually in the stationary parts of the overall measurement device.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A device for measuring temperature in a metal melt, comprising an optical fiber (2) connected directly or indirectly to a measurement instrument and held by a carrier (6), the optical fiber (2) having an immersion end which is guided through a melt-consumable body (1), such that the consumable body (1) and the optical fiber (2) are destroyed, wherein the consumable body (1) exhibits a consumption rate in the melt of at most 10 cm/min and wherein the consumption rate is approximately equal to or greater than a rate at which the optical fiber (2) is destroyed.

2. The device according to claim 1, wherein the body (1) exhibits a consumption rate of at most 1 cm/min.

3. The device according to claim 1, wherein the consumable body (1) has a higher melting point than iron and is insoluble in molten iron.

4. The device according to claim 1, wherein the consumable body (1) comprises at least one material selected from the group consisting of molding sand, refractory cement, and bonded fly ash.

5. The device according to claim 1, wherein the fiber (2) comprises quartz glass.

6. The device according to claim 1, wherein the fiber (2) is at least partially surrounded by a metal tube.

7. The device according to claim 6, wherein the tube is a steel tube.

8. The device according to claim 1, wherein the fiber (2) is connected to a detector (8).

9. The device according to claim 8, wherein the detector (8) is arranged in the consumable body (1).

10. The device according to claim 1, wherein a consumption sensor is arranged in the consumable body (1).

11. The device according to claim 1, wherein mechanical stabilizers (4) are arranged in the consumable body (1).

12. The device according to claim 1, wherein the consumable body (1) is detachably arranged at one end of the carrier (6).

13. The device according to claim 1, wherein electrical and/or optical signal lines in the consumable body (1) are connected by electrical and/or optical contacts to a connector (10) in the carrier (6).

14. The device according to claim 1, wherein the optical fiber (2) comprises an endless fiber.

15. The device according to claim 1, wherein the optical fiber (2) is movably arranged in the carrier (16) and/or the consumable body (1).

16. A method for measuring temperature in a metal melt with an optical fiber (2), connected directly or indirectly to a measurement instrument and held by a carrier (6), wherein an immersion end of the fiber (2) is guided through a melt-consumable body (1) held on the carrier (6), the method comprising immersing the immersion end of the fiber (2) together with at least one part of a first consumable body (1) at least once into the metal melt, detaching the first consumable body (1) after at least partial consumption of the carrier (6), and replacing the first consumable body (1) by a second consumable body (1), and continuously feeding the fiber (2) through the second body (1).

* * * * *